United States Patent
Kumazaki et al.

(10) Patent No.: US 11,724,628 B2
(45) Date of Patent: Aug. 15, 2023

(54) VEHICLE SEAT

(71) Applicants: TOYOTA BOSHOKU KABUSHIKI KAISHA, Aichi (JP); SUMITOMO RIKO COMPANY LIMITED, Aichi (JP)

(72) Inventors: Yoshiyuki Kumazaki, Aichi (JP); Koji Kimura, Aichi (JP); Yoshihiro Motoi, Aichi (JP); Katsuhiko Katagiri, Aichi (JP)

(73) Assignees: TOYOTA BOSHOKU KABUSHIKI KAISHA, Aichi (JP); SUMITOMO RIKO COMPANY LIMITED, Aichi (JP)

( * ) Notice: Subject to any disclaimer, the term of this patent is extended or adjusted under 35 U.S.C. 154(b) by 0 days.

(21) Appl. No.: 17/729,740

(22) Filed: Apr. 26, 2022

(65) Prior Publication Data

US 2022/0348122 A1    Nov. 3, 2022

(30) Foreign Application Priority Data

Apr. 30, 2021  (JP) ................................. 2021-077938

(51) Int. Cl.
*B60N 2/68*    (2006.01)
*B60R 22/26*   (2006.01)

(52) U.S. Cl.
CPC ............. *B60N 2/682* (2013.01); *B60N 2/688* (2013.01); *B60R 22/26* (2013.01)

(58) Field of Classification Search
CPC .................................................. B60N 2/682
See application file for complete search history.

(56) References Cited

U.S. PATENT DOCUMENTS 9,004,437 B2 * 4/2015 Yamada ............... B60N 2/0818
                                                296/65.13
10,086,792 B1 * 10/2018 Watanabe .............. B60N 2/688
(Continued)

FOREIGN PATENT DOCUMENTS

DE    102008010719 A1 *  8/2009  ............. B60N 2/015
DE    102011009211 A1 *  7/2012  ............. B60N 2/682
(Continued)

OTHER PUBLICATIONS

Chinese First Office Action dated Mar. 20, 2023 in counterpart Chinese patent application No. 202210450869.0 (and English translation thereof).

*Primary Examiner* — Timothy J Brindley
(74) *Attorney, Agent, or Firm* — Greenblum & Bernstein, P.L.C.

(57) ABSTRACT

A vehicle seat capable of exhibiting both performances of regulating an input of a load and reducing vibration is provided. One aspect of the present disclosure is a vehicle seat including a coupling structure coupling a first member and a second member. The coupling structure includes a bolt inserted through the first member and the second member, an auxiliary member arranged so as to hold the first member between the auxiliary member and the second member in an axial direction of the bolt, a first elastic element arranged between the first member and the second member in the axial direction, the first elastic element being in contact with the first member and the second member, and a second elastic element arranged between the first member and the auxiliary member in the axial direction, the second elastic element being in contact with the first member and the auxiliary member.

6 Claims, 6 Drawing Sheets

(56) References Cited

U.S. PATENT DOCUMENTS

2019/0338843 A1\* 11/2019 Römer ................ B60N 2/1615
2021/0138945 A1\* 5/2021 Yamaguchi ............ B60N 2/682

FOREIGN PATENT DOCUMENTS

| DE | 102014220242 A1 \* | 4/2015 | ............. B60N 2/015 |
| EP | 3789238 A1 \* | 3/2021 | ........... B60N 2/0715 |
| JP | 2016130056 A | 7/2016 | |
| JP | 6035354 B2 | 11/2016 | |
| WO | WO-2013022063 A1 \* | 2/2013 | ............. B60N 2/002 |
| WO | WO-2019238852 A1 \* | 12/2019 | ............... B60N 2/64 |
| WO | WO-2022020568 A1 \* | 1/2022 | |

\* cited by examiner

VEHICLE SEAT

CROSS-REFERENCE TO RELATED APPLICATIONS

This application claims the benefit of priority based on Japanese patent application No. 2021-077938 filed on Apr. 30, 2021 with the Japan Patent Office and the entire disclosure of which is incorporated herein by reference.

BACKGROUND

The present disclosure relates to a vehicle seat.

In a cushion frame of the vehicle seat, a coupling structure with a bolt and a nut is used to couple two members (see Japanese Patent No. 6035354). In this coupling structure, an elastic element such as rubber is arranged between the coupled members to inhibit transmission of vibration.

SUMMARY

The above-mentioned coupling structure includes a first elastic element held between the two members to be coupled, and a second elastic element pressed to one of the members by a washer. The first elastic element, out of the two elastic elements, regulates the input of a large load.

However, in addition to the role of regulating the input of the load (i.e. a role of absorbing the load by deformation), the first elastic element plays a role of inhibiting vibration together with the second elastic element. In the elastic element, the performance of regulating the input and the performance of inhibiting vibration are mutually exclusive. Therefore, the first elastic element in the above-mentioned coupling structure cannot sufficiently regulate the input of the load when a seat belt and a belt anchor are pulled toward a seat front side by a collision load and the like, and there may be a danger of the seat being lifted.

One aspect of the present disclosure is, preferably, to provide a vehicle seat capable of exhibiting both performances of regulating input of the load and reducing vibration.

One mode of the present disclosure is a vehicle seat including a seat cushion, a seatback, a cushion frame supporting the seat cushion, a seat belt, and a belt anchor to discharge the seat belt from an inside of the seatback. The cushion frame includes a first member, a second member, and a coupling structure coupling the first member and the second member.

The coupling structure includes a bolt inserted through the first member and the second member, a nut screwed with the bolt, an auxiliary member arranged so as to hold the first member between the auxiliary member and the second member in an axial direction of the bolt, a first elastic element arranged between the first member and the second member in the axial direction of the bolt, the first elastic element being in contact with the first member and the second member, and a second elastic element arranged between the first member and the auxiliary member in the axial direction of the bolt, the second elastic element being in contact with the first member and the auxiliary member.

This configuration allows the first elastic element to have a function of reducing vibration, and allows the second elastic element to have a function of regulating the input of the load. In this way, the two functions are separated and the two elastic elements each perform one function, whereby the coupling structure can exhibit both performances of regulating the input of the load and reducing vibration.

In one mode of the present disclosure, the second elastic element may have a spring constant larger than a spring constant of the first elastic element. This configuration allows to improve the respective performances of regulating the input of the load and reducing vibration.

In one mode of the present disclosure, the first elastic element and the second elastic element each may have a cylindrical shape or an annular shape through which the bolt is inserted. This configuration allows to reduce foreign matters entering into the inside of the coupling structure from a gap between the first elastic element and the second elastic element.

In one mode of the present disclosure, the second member may have a collar that penetrate through the first member and that is inserted by the bolt. The coupling structure may have a third elastic element held between the collar and the first member in a radial direction of the bolt. In this configuration, the performance of reducing vibration in the radial direction of the bolt can be improved by the third elastic element.

In one mode of the present disclosure, the coupling structure may have an elastic member in which the first elastic element and the third elastic element are integrated. This configuration allows to improve the performance of reducing vibration, and to reduce the number of components.

In one mode of the present disclosure, the first member may have a cylindrical part through which the bolt is inserted. The second elastic element may include a base in contact with an end of the cylindrical part in an axial direction thereof, and a guide portion protruding from the base in an axial direction of the cylindrical part, the guide portion surrounding the cylindrical part from radially outside. This configuration makes it easy to position the first member and the auxiliary member when the first member and the second member are coupled.

BRIEF DESCRIPTION OF THE DRAWINGS

Some example embodiments of the present disclosure will be described hereinafter by way of example with reference to the accompanying drawings, in which.

DETAILED DESCRIPTION OF EXEMPLARY EMBODIMENTS

1. First Embodiment

[1-1. Configuration]

Figure 1:
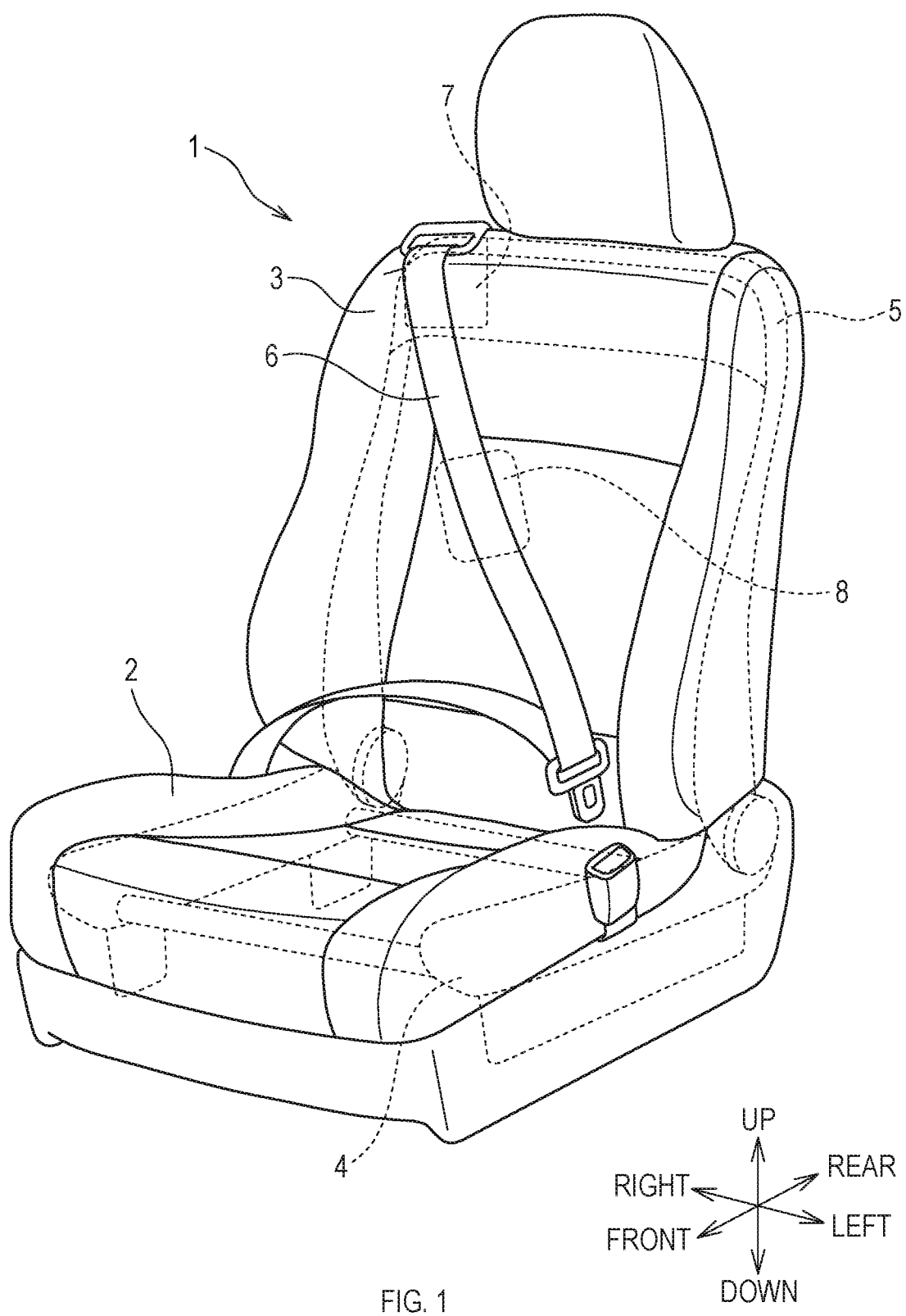
FIG. 1 is a schematic perspective view showing a vehicle seat of one embodiment.

A vehicle seat 1 shown in FIG. 1 includes a seat cushion 2, a seatback 3, a cushion frame 4, a back frame 5, a seat belt 6, a belt anchor 7 and a retractor 8.

The vehicle seat 1 is used as a seat in a passenger car. Note that directions in the following description and the drawings mean directions in a state where the vehicle seat 1 is installed in a vehicle (i.e. a passenger car). In this embodiment, a seat-width direction corresponds to a left-right direction of the vehicle, and a seat front side corresponds to the front of the vehicle.

The seat cushion 2 is a part to support the buttocks of an occupant. The seatback 3 is a part to support the back of the occupant. The cushion frame 4 supports the seat cushion 2. The back frame 5 supports the seatback 3.

The seat belt 6 is configured to extend from one shoulder of the seatback 3 (a right shoulder in the present embodiment) across the seatback 3 in the seat-width direction toward an end in a seat-width direction of the seat cushion 2 (a left side end in the present embodiment), whereby the occupant wears the belt.

The belt anchor 7 is a guide that discharges the seat belt 6 from the inside of the seatback 3 and that pulls back the seat belt 6 into the inside of the seatback 3. The belt anchor 7 is attached to the back frame 5.

The retractor 8 is a device to wind up the seat belt 6. The retractor 8 is held by the back frame 5 inside the seatback 3. The seat belt 6 extends between the retractor 8 and the belt anchor 7 inside the seatback 3.

<Cushion Frame>

Figure 2:
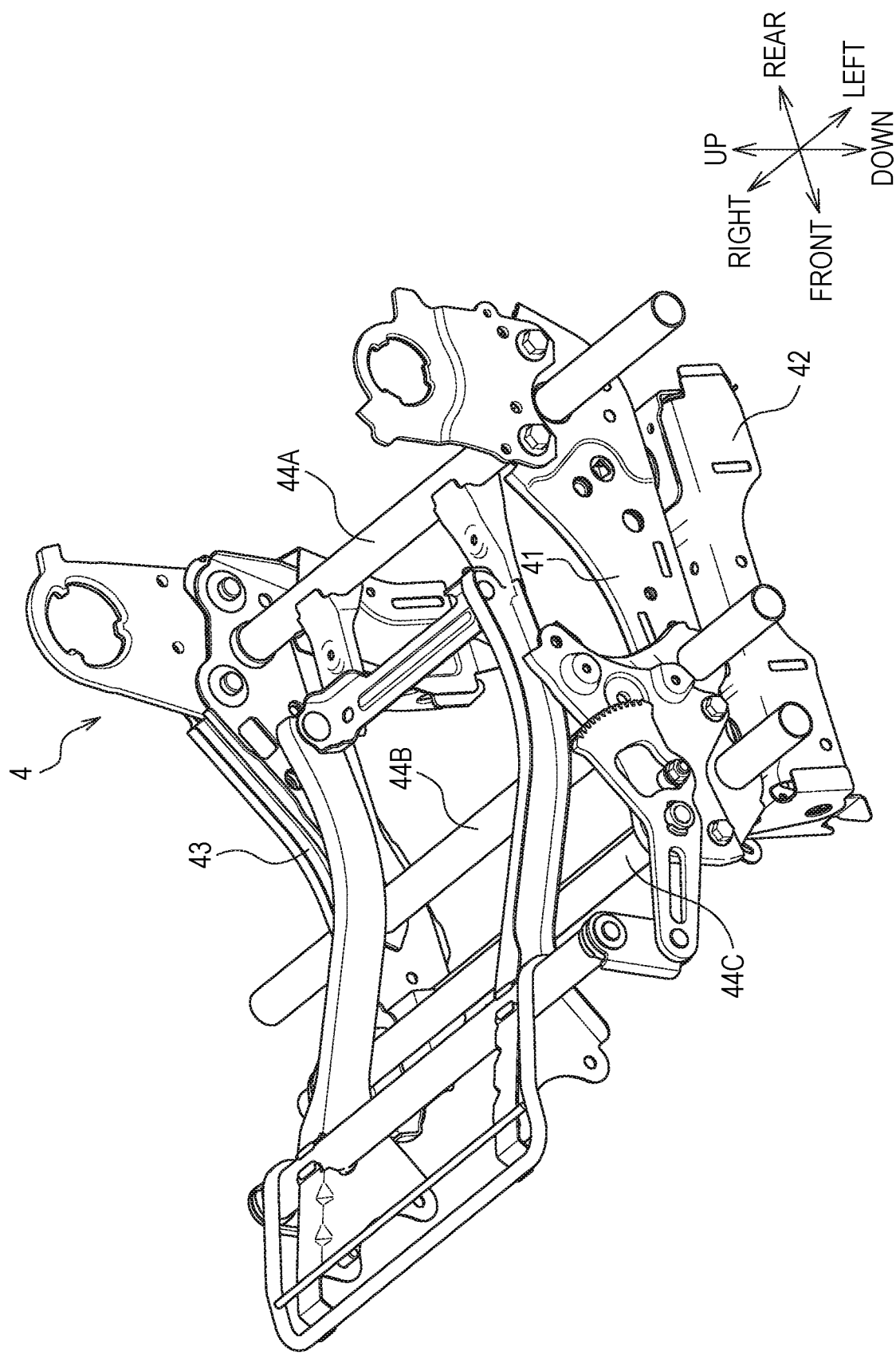
FIG. 2 is a schematic perspective view of a cushion frame of FIG. 1.

The cushion frame 4 includes, as shown in FIG. 2, a first side frame 41, a leg 42, a second side frame 43, and multiple coupling rods 44A, 44B, 44C.

The first side frame 41 and the second side frame 43 each extend in a front-rear direction, and are arranged apart from each other in the seat-width direction. The leg 42 is coupled to a lower end of the first side frame 41. The multiple coupling rods 44A, 44B, 44C each couple the first side frame 41 and the second side frame 43 in the seat-width direction.

Figure 3:
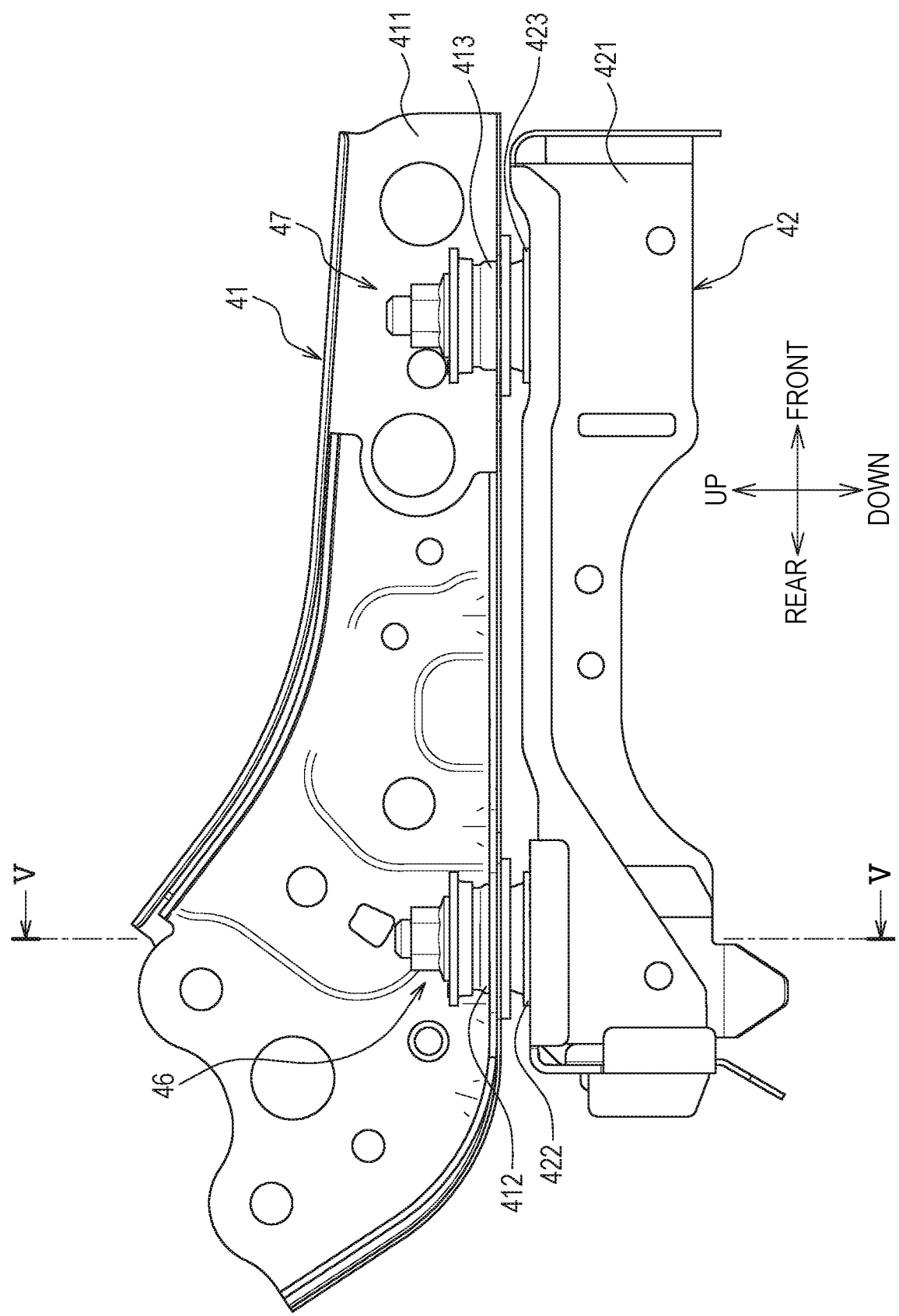
FIG. 3 is a schematic side-view showing a part of the cushion frame of FIG. 2.

As shown in FIG. 3, the first side frame 41 and the leg 42 are coupled in an up-down direction by a first coupling structure 46 and a second coupling structure 47.

Figure 4:
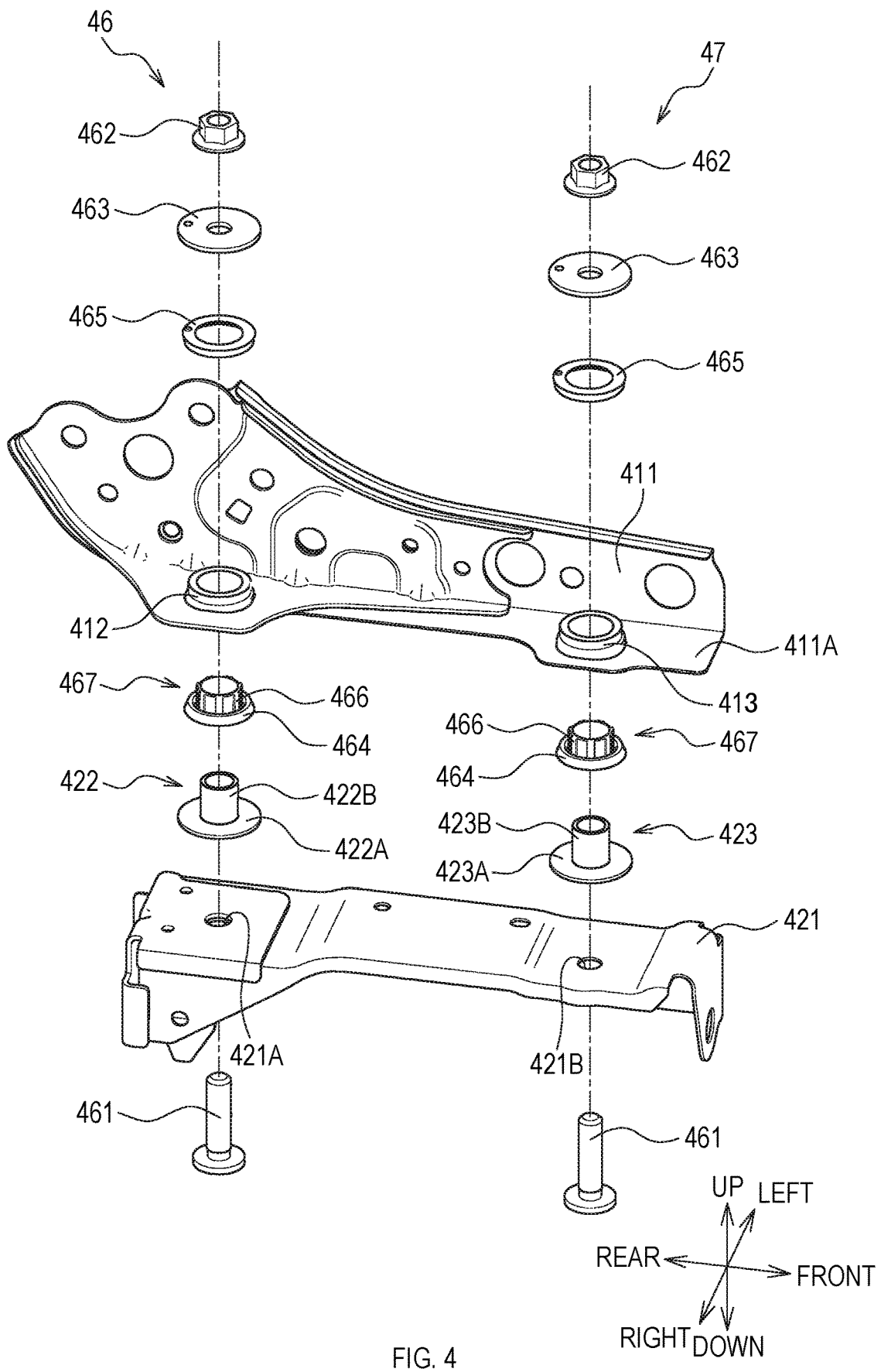
FIG. 4 is a schematic exploded perspective view of a first coupling structure and a second coupling structure of FIG. 2.

As shown in FIG. 4, the first side frame 41 includes a side panel 411, a first cylindrical part 412, and a second cylindrical part 413. The first cylindrical part 412 and the second cylindrical part 413 are joined to a bottom wall 411A extending in a seat front-rear direction of the side panel 411 (i.e. the bottom wall 411A having a plate surface intersecting with the up-down direction) by welding, for example.

The first cylindrical part 412 and the second cylindrical part 413 penetrate through the bottom wall 411A in a thickness direction. A bolt 461 is inserted through the first cylindrical part 412, and a second bolt 461 is inserted through the second cylindrical part 413.

The leg 42 includes a leg panel 421, a first collar 422, and a second collar 423. The leg panel 421 includes a first opening 421A and a second opening 421B through which the bolts 461 are inserted.

The first collar 422 is a cylindrical member arranged so that a hollow center communicates with the first opening 421A. The first collar 422 includes a disk-shaped flange portion 422A in contact with the leg panel 421, and a cylindrical main body 422B extending upward from the flange portion 422A (i.e., the cylindrical main body 422B extends toward the first side frame 41).

The main body 422B of the first collar 422 is inserted through the first cylindrical part 412. That is, the first collar 422 penetrates through the first side frame 41. An upper end of the main body 422B in an axial direction thereof is located above an upper end of the first cylindrical part 412 in an axial direction thereof.

The second collar 423 is a cylindrical member arranged so that a hollow center communicates with the second opening 421B. The second collar 423 has a flange portion 423A and a main body 423B similar to those of the first collar 422.

The main body 423B of the second collar 423 is inserted through the second cylindrical part 413. That is, the second collar 423 penetrates through the first side frame 41. An upper end of the main body 423B in an axial direction thereof is located above an upper end of the second cylindrical part 413 in an axial direction thereof.

The bolt 461 is inserted through the first collar 422, and the second bolt 461 is inserted through the second collar 423. The first collar 422 and the second collar 423 are not directly fixed to the leg panel 421.

<Coupling Structure>

The first coupling structure 46 includes the bolt 461, a nut 462, an auxiliary member 463, a first elastic element 464, a second elastic element 465, and a third elastic element 466. The first elastic element 464 and the third elastic element 466 form an elastic member 467.

The bolt 461 is inserted through the first side frame 41 and the leg 42. Specifically, the bolt 461 is inserted through the leg panel 421, the first collar 422, the elastic member 467, the second elastic element 465, the auxiliary member 463, and the nut 462.

The head of the bolt 461 is located on the opposite side of the first side frame 41 with the leg 42 interposed (i.e. the head of the bolt 461 is located below the leg 42). The bolt 461 is inserted from a leg 42 side during the assembly of the cushion frame 4. In this embodiment, the head of the bolt 461 is in contact with the leg panel 421.

The nut 462 is screwed with the bolt 461, The nut 462 is arranged at a position where the first side frame 41 is held between the nut 462 and the leg 42 in an axial direction of the bolt 461 (i.e. the nut 462 is arranged above the first side frame 41). In this embodiment, the nut 462 is in contact with the auxiliary member 463.

The auxiliary member 463 is a disk-shaped member with an opening in the center thereof to insert the bolt 461. The auxiliary member 463 has an inner diameter smaller than an inner diameter of the main body 422B of the first collar 422. The auxiliary member 463 has an outer diameter larger than an outer diameter of the second elastic element 465.

The auxiliary member 463 is arranged so as to hold the first side frame 41 between the auxiliary member 463 and the leg 42 in the axial direction of the bolt 461. Specifically, the first cylindrical part 412 of the first side frame 41 is arranged between the auxiliary member 463 and the leg 42 in the axial direction of the bolt 461. A lower surface of the auxiliary member 463 is in contact with an upper end of the main body 422B of the first collar 422 in the axial direction thereof.

Figure 5:
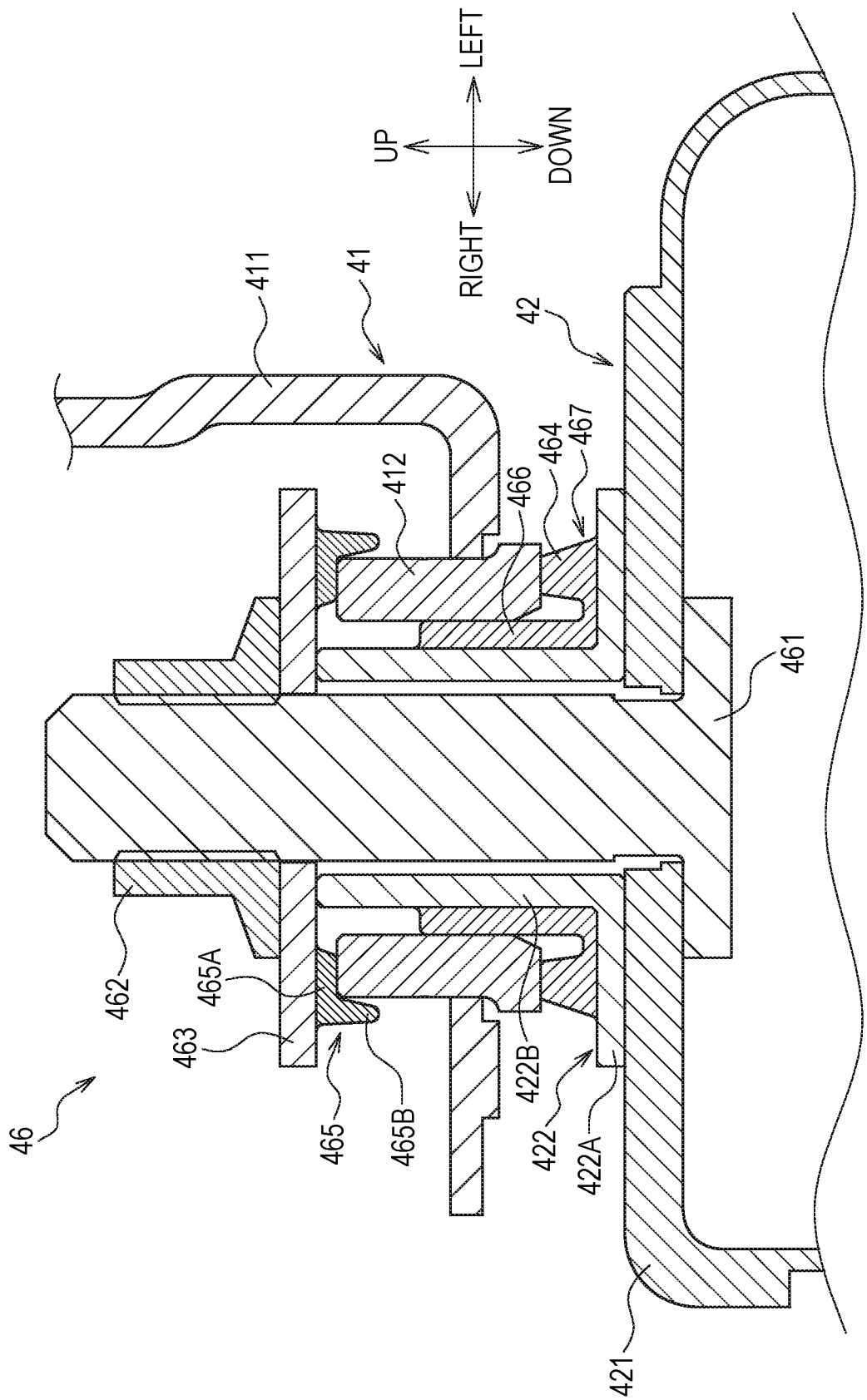
FIG. 5 is a schematic end view of a sectioned part taken along a V-V line of FIG. 3.

The first elastic element 464 is a cylindrical member through which the bolt 461 is inserted. The material of the first elastic element 464 is rubber, for example. As shown in FIG. 5, the first elastic element 464 is arranged between the first side frame 41 (i.e. the first cylindrical part 412) and the leg 42 in the axial direction of the bolt 461 and is in contact with the first side frame 41 (i.e. the first cylindrical part 412) and the leg 42.

The first elastic element 464 is compressed in the axial direction of the bolt 461 by the flange portion 422A of the first collar 422 and a lower end of the first cylindrical part 412 in the axial direction thereof due to the fastening of the bolt 461 and the nut 462. The first elastic element 464 is provided in the entire circumferential direction of the bolt 461.

The second elastic element 465 is a cylindrical member through which the bolt 461 is inserted. The material of the second elastic element 465 is rubber, for example. The second elastic element 465 is arranged between the first side frame 41 and the auxiliary member 463 in the axial direction of the bolt 461 and is in contact with the first side frame 41 and the auxiliary member 463. The second elastic element 465 is fixed to the lower surface of the auxiliary member 463 by adhesion, for example.

Figure 6A:
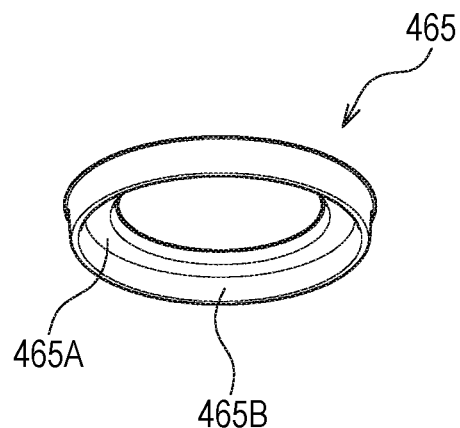
FIG. 6A is a schematic perspective view of the second elastic element of FIG. 4.

As shown in FIG. 6A, the second elastic element 465 includes a base 465A and a guide portion 465B. The base 465A is compressed in the axial direction of the bolt 461 by an upper end of the first cylindrical part 412 in the axial direction thereof and the lower surface of the auxiliary member 463 due to the fastening of the bolt 461 and the nut 462.

The guide portion 465B protrudes from the base 465A in the axial direction of the first cylindrical part 412 and surrounds the first cylindrical part 412 from radially outside. Specifically, the guide portion 465B is a cylindrical part protruding downward from a lower surface of the base 465A.

As shown in FIG. 5, an inner peripheral surface of the guide portion 465B is in contact with an outer peripheral surface of the first cylindrical part 412. That is, the first cylindrical part 412 is inserted into the guide portion 465B. The base 465A and the guide portion 465B are provided, in the entire circumferential direction of the bolt 461.

The first cylindrical part 412 is held between the first elastic element 464 and the second elastic element 465 in the axial direction of the bolt 461. Thus, between the auxiliary member 463 and the first collar 422, there is no gap that is communicated with the inside of the first cylindrical part 412. In other words, the interior space of the first cylindrical part 412 is sealed by the auxiliary member 463, the second elastic element 465, the first elastic element 464, and the first collar 422.

The second elastic element 465 has a spring constant larger than a spring constant of the first elastic element 464 (i.e. elastic member 467), That is, the second elastic element 465 is firmer and less deformable than the first elastic element 464. Thus, the second elastic element 465 exhibits better performance of regulating the input of the load than the first elastic element 464. The second elastic element 465 also exhibits an effect of reducing abnormal noise caused by vibration in the first coupling structure 46.

The third elastic element 466 is a cylindrical member through which the bolt 461 is inserted. The third elastic element 466 is integrally formed with the first elastic element 464. That is, the first coupling structure 46 has the elastic member 467 in which the first elastic element 464 and the third elastic element 466 are integrated.

The third elastic element 466 is arranged radially inside the first elastic element 464. A lower end of the third elastic element 466 in an axial direction thereof is connected to the first elastic element 464 in a radial direction of the bolt 461. The elastic member 467 is fixed to the first collar 422 by adhesion, for example.

The third elastic element 466 is held between the first collar 422 and the first side frame 41 (i.e. first cylindrical part 412) in the radial direction of the bolt 461. Specifically, an inner peripheral surface of third elastic element 466 is in contact with an outer peripheral surface of the main body 422B of the first collar 422, and an outer peripheral surface of the third elastic element 466 is in contact with an inner peripheral surface of the first cylindrical part 412.

An upper end of the third elastic element 466 in the axial direction thereof is located above an upper end of the first elastic element 464. That is, a length of the third elastic element 466 in an axial direction thereof is longer than that of the first elastic element 464. The upper end of the third elastic element 466 in the axial direction thereof is spaced apart from the auxiliary member 463.

Figure 6B:
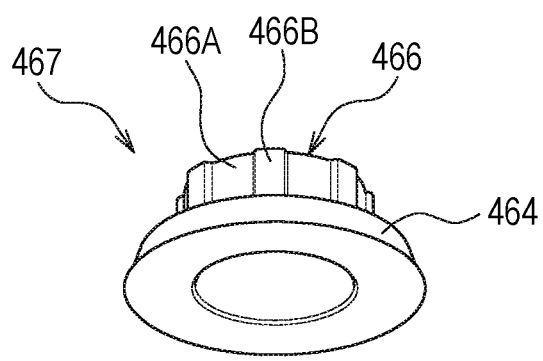
FIG. 6B is a schematic perspective view of an elastic member of FIG. 4.

As shown in FIG. 6B, the third elastic element 466 includes a holder 466A and multiple convex parts 466B. The holder 466A is a cylindrical part. The holder 466A has an outer peripheral surface that is not in contact with the first cylindrical part 412.

The multiple convex parts 466B are arranged at regular intervals in a circumferential direction of the holder 466A. The convex part 466B is a part protruding from the outer peripheral surface of the holder 466A radially outward of the holder 466A. The convex part 466B is compressed by the first collar 422 and the first cylindrical part 412 in a radial direction of the holder 466A.

The second coupling structure 47 shown in FIG. 4 includes the second bolt 461, a nut 462, an auxiliary member 463, an elastic member 467 (i.e. a first elastic element 464 and a third elastic element 466), and a second elastic element 465 similar to those of the first coupling structure 46.

The second coupling structure 47 couples the first side frame 41 and the leg 42 in the up-down direction in an area closer to the seat front side than an area where the first coupling structure 46 is provided. An axial direction of the second bolt 461 in the second coupling structure 47 is the same as that in the first coupling structure 46. Since other configurations are also the same as those of the first coupling structure 46, explanation is omitted.

[1-2. Effects]

According to the embodiment described above, the following effects can be obtained.

(1a) It is possible that the second elastic element 465 has a function to regulate the input of the load while the first elastic element 464 has a function to reduce vibration. In this way, the two functions are separated and the two elastic elements each perform one function, whereby the coupling structures 46, 47 can exhibit both performances of regulating the input of the load and reducing vibration.

(1b) The second elastic element 465 has a spring constant larger than a spring constant of the first elastic element 464. Therefore, respective performances of regulating the input of the load and reducing vibration in the coupling structures 46, 47 can be improved.

(1c) The first elastic element 464 and the second elastic element 465 each have a cylindrical shape or an annular shape. Therefore, it is possible to reduce foreign matters entering into the inside of the coupling structures 46, 47 from a gap between the first elastic element 464 and the second elastic element 465.

(1d) With the third elastic element 466, it is possible to improve the performance of reducing vibration in the radial direction of the bolt 461.

(1e) Since the first elastic element 464 and the third elastic element 466 are integrated into one elastic member 467, the performance of reducing vibration can be improved and the number of components can be reduced.

(1f) The second elastic element 465 has the guide portion 465B. This makes it easy to position the first side frame 41 and the auxiliary member 463 when the first side frame 41 and the leg 42 are coupled.

2. Other Embodiments

Although the embodiment of the present disclosure has been described above, it goes without saying that the present disclosure is not limited to the above embodiment and can take various forms.

(2a) In the vehicle seat of the above-described embodiment, a position where the coupling structure is provided is not limited, to the above-mentioned position. For example, the coupling structure may be provided to the second side frame. From a viewpoint of regulating the input of the load when the belt anchor is pulled toward the seat front side, it is preferable that the coupling structure is provided to a location spaced apart from the belt anchor (i.e. a location displaced from an area immediately below the belt anchor).

Components coupled by the coupling structure are not limited to the side frame and the leg. For example, the coupling structure may couple the side frame with a slide rail. In addition, a coupling direction of the coupling structure is not limited to the up-down direction and may be a direction intersecting with the up-down direction (e.g. a horizontal direction).

(2b) In the vehicle seat of the above-described embodiment, the first elastic element and the second elastic element do not necessarily have the cylindrical shape or the annular shape. For example, the first elastic element and the second elastic element may have a cutout in a part in the circumferential direction.

(2c) In the vehicle seat of the above-described embodiment, the third elastic element is not necessarily integrated with the first elastic element and may be a member separated from the first elastic element. In addition, the coupling structure does not necessarily have the third elastic element.

(2d) In the vehicle seat of the above-described embodiment, the second elastic element does not necessarily have the guide portion, Therefore, the outer diameter of the second elastic element may be smaller than an outer diameter of the cylindrical part of a first member (i.e. the first side frame).

(2e) In the vehicle seat of the above-described embodiment, the bolt may be inserted from an auxiliary member side during the assembly of the cushion frame. The auxiliary member may be integrated with the nut or the bolt. For example, the auxiliary member in contact with the second elastic element may be provided in a washer part of the nut or the head of the bolt.

(2f) The vehicle seat of the above-described embodiment can be applied to seats used in automobiles other than passenger cars, and also applied to seats used in vehicles other than the automobiles, such as railway vehicles, ships, and aircrafts.

(2g) A function served by a single element in any of the above-described embodiments may be achieved by a plurality of elements, or a function served by a plurality of elements may be achieved by a single element. In addition, a part of the configurations of the aforementioned embodiments may be omitted. Furthermore, at least a part of the configurations of the aforementioned embodiments may be added to or replaced with the configurations of other aforementioned embodiments. It should be noted that all modes included in the technical idea specified from the wording described in the claims are embodiments of the present disclosure.

What is claimed is:

1. A vehicle seat comprising:
   a seat cushion;
   a seatback;
   a cushion frame supporting the seat cushion,
   a seat belt; and
   a belt anchor to discharge the seat belt from an inside of the seatback,
   wherein the cushion frame includes
      a first member,
      a second member, and
      a coupling structure coupling the first member and the second member,
   wherein the coupling structure includes
      a bolt inserted through the first member and the second member,
      a nut screwed with the bolt,
      an auxiliary member arranged so as to hold the first member between the auxiliary member and the second member in an axial direction of the bolt,
      a first elastic element arranged between the first member and the second member in the axial direction of the bolt, the first elastic element being in contact with the first member and the second member, and
      a second elastic element arranged between the first member and the auxiliary member in the axial direction of the bolt, the second elastic element being in contact with the first member and the auxiliary member.

2. The vehicle seat according to claim 1, wherein the second elastic element has a spring constant larger than a spring constant of the first elastic element.

3. The vehicle seat according to claim 1, wherein the first elastic element and the second elastic element each have a cylindrical shape or an annular shape through which the bolt is inserted.

4. The vehicle seat according to claim 1, wherein the second member has a collar that penetrates through the first member and that is inserted by the bolt, and
wherein the coupling structure has a third elastic element held between the collar and the first member in a radial direction of the bolt.

5. The vehicle seat according to claim 4 wherein the coupling structure has an elastic member in which the first elastic element and the third elastic element are integrated.

6. The vehicle seat according to claim 1, wherein the first member has a cylindrical part through which the bolt is inserted, and
wherein the second elastic element includes a base in contact with an end of the cylindrical part in an axial direction thereof, and a guide portion protruding from the base in an axial direction of the cylindrical part, the guide portion surrounding the cylindrical part from radially outside.

* * * * *